United States Patent [19]
Bergenlid et al.

[11] Patent Number: 5,535,429
[45] Date of Patent: Jul. 9, 1996

[54] METHOD OF DISCONNECTING AN ESTABLISHED COMMUNICATION CONNECTION IN A MOBILE RADIO SYSTEM

[75] Inventors: Lars H. Bergenlid, Sollentuna; Ulf C. Eklund, Uppsala, both of Sweden

[73] Assignee: Telefonaktiebolaget LM Ericsson, Stockholm, Sweden

[21] Appl. No.: 186,918

[22] Filed: Jan. 27, 1994

[30] Foreign Application Priority Data

Jan. 27, 1993 [SE] Sweden ................................ 9300244

[51] Int. Cl.$^6$ ........................................................ H04B 1/00
[52] U.S. Cl. ................ 455/53.1; 455/33.1; 455/34.1; 455/34.2; 455/54.1; 455/58.1; 370/95.1
[58] Field of Search ............................ 455/54.1, 53.1, 455/54.2, 63, 34.1, 34.2, 8, 9, 88, 69, 70, 58.1, 33.1; 370/95.1, 95.2, 110.1

[56] References Cited

U.S. PATENT DOCUMENTS

| | | | |
|---|---|---|---|
| 4,736,461 | 4/1988 | Kawasaki et al. | 455/343 |
| 4,809,268 | 2/1989 | Tejima et al. | 370/93 |
| 4,984,290 | 1/1991 | Levine et al. | |
| 5,008,953 | 4/1991 | Dahlin et al. | 455/33 |
| 5,027,427 | 6/1991 | Shimizu | 455/67 |
| 5,142,533 | 8/1992 | Crisler et al. | 370/95.1 |

FOREIGN PATENT DOCUMENTS

| | | |
|---|---|---|
| 438137 | 7/1991 | European Pat. Off. . |
| 0511008 | 10/1992 | European Pat. Off. . |

OTHER PUBLICATIONS

"Digital Cellular Telecommunication System RCR Standard", RCR STD–27A, Version Jan. 1992, Research and Development Center for Radio Systems (RCR), Chapters 4.3.5.2.21–22 and 4.3.8.4.

*Primary Examiner*—Reinhard J. Eisenzopf
*Assistant Examiner*—Lee Nguyen
*Attorney, Agent, or Firm*—Burns, Doane, Swecker & Mathis

[57] ABSTRACT

A method of forcibly disconnecting a communications connection established between a mobile station and a mobile services switching network, depending on whether the communications connection initially allocated to the mobile station has deteriorated or that a call connection or a handover attempt has failed. With the intention of forcing the mobile station to relinquish the allocated channel, the network transmits to the mobile station a signal which activates a time monitoring process in the mobile station, which thereby sends an acknowledgement signal back to the network. When the network does not wish the mobile station to retain the allocated channel, a signal which would stop the time monitoring process is not sent to the mobile station, thereby resulting in the release of the communications channel. Also described is a mobile station which includes counter-circuits for effecting the time monitoring process.

6 Claims, 3 Drawing Sheets

METHOD OF DISCONNECTING AN ESTABLISHED COMMUNICATION CONNECTION IN A MOBILE RADIO SYSTEM

BACKGROUND

The present invention relates to a method of clearing, and therewith releasing, a communication connection established between a mobile station and a mobile radio network that form part of a mobile radio system. The system includes a plurality of mobile stations that are served by the network, and may also include several networks with associated mobile stations. More specifically, but not exclusively, the invention relates to a method of forcing a mobile station to relinquish an allocated radio channel when reception is impaired, so that this channel can be better used by another mobile station in which reception on precisely this radio channel is better. The invention also relates to a mobile station which utilizes the proposed method.

The mobile stations (the mobile telephone sets) of a mobile radio system, for instance a mobile telephone system, normally use a so-called dedicated radio resource as a communications channel when establishing radio communication between the mobile station and the network. By "network" is meant in the following a base station with which the mobile station can communicate directly, and a mobile radio exchange which establishes and executes the fixed connections between a given number of different base stations. The mobile radio exchange is also normally connected to a fixed public switched telephone network (PSTN or ISDN). In the majority of cases, the communications channel assigned to the mobile station is a so-called traffic channel over which speech or data information is transmitted.

When there is no longer any need for this communications channel, the mobile station releases its allocated radio resource, so that this resource can be reused by another user. Since the allocated radio resources (the radio channels) in the medium are scarce in relation to the number of users, it is obviously of great importance that a radio resource which is not utilized to the full or a radio resource which is poorly used by a user quickly becomes available for another user.

Both the allocation of a radio channel to a mobile station, i.e. when the mobile station begins communicating with the network over the allocated channel, and disconnection of the mobile station from the allocated channel, i.e. when the mobile station ceases to communicate over said channel and releases the same, are controlled by signalling between the network and the mobile station.

In the case of cellular and frequency/time division systems, for instance cellular TDMA-systems, it is known to control a normal situation, such as disconnecting the mobile station from the communications channel, in accordance with a signalling procedure between the network and the mobile station; see for instance "DIGITAL CELLULAR TELECOMMUNICATION SYSTEM RCR STANDARD" RCR STD-27A, Version January 1992, Research and Development Center for Radio Systems (RCR), Chapters 4.3.5.2.21–22 and 4.3.8.4.

In this signalling procedure the network sends to the mobile station a signal which commands the mobile station to relinquish the radio resource (the radio channel). When receiving this command signal, but before relinquishing the radio channel, the mobile station sends a signal confirming that the command has been received, and the mobile station relinquishes the radio resource immediately after the confirmation signal has been sent to the network.

Thus, when practicing this signalling procedure, the network is made aware by the mobile station that said station intends to relinquish the communications channel, thereby informing the network that this communications channel can be reused.

SUMMARY

However, when setting-up a connection, there are many instances when the radio connection, in either direction or in both directions, has been degraded to such an extent that the aforesaid signalling procedure is no longer sufficiently reliable. In cases such as these, it is necessary to take measures other than purely signalling procedures when clearing or disconnecting a connection, in order to be certain that the mobile station has relinquished the channel. In certain analog cellular systems, for instance the Nordic mobile telephone network NMT 450 and NMT 900, the carrier wave signal used in the radio communication is cleared or disconnected. This method cannot be used with TDMA-systems, for instance the Japanese system JDC under development, because more than one channel, particularly a control channel is transmitted on a given carrier frequency which according to the specification may not be adjusted in a negative sense. Furthermore, the mobile shall be able to measure on all three time slots on this frequency.

The primary object of the present invention is to provide a method for disconnecting effectively a communications connection that has been established between a mobile station and a mobile radio network when, for some reason, communication becomes impaired, thus making it necessary to use another radio resource, and so that the current connection can be released, for instance so that the communications channel can be used by another mobile station.

This object is achieved by beginning to send to the mobile station information which forces the station to relinquish the current communication connection, after having established by signalling procedure that the current connection has been impaired.

BRIEF DESCRIPTION OF THE DRAWINGS

The invention will now be described with reference to the accompanying drawings, in which.

DETAILED DESCRIPTION

Figure 1:
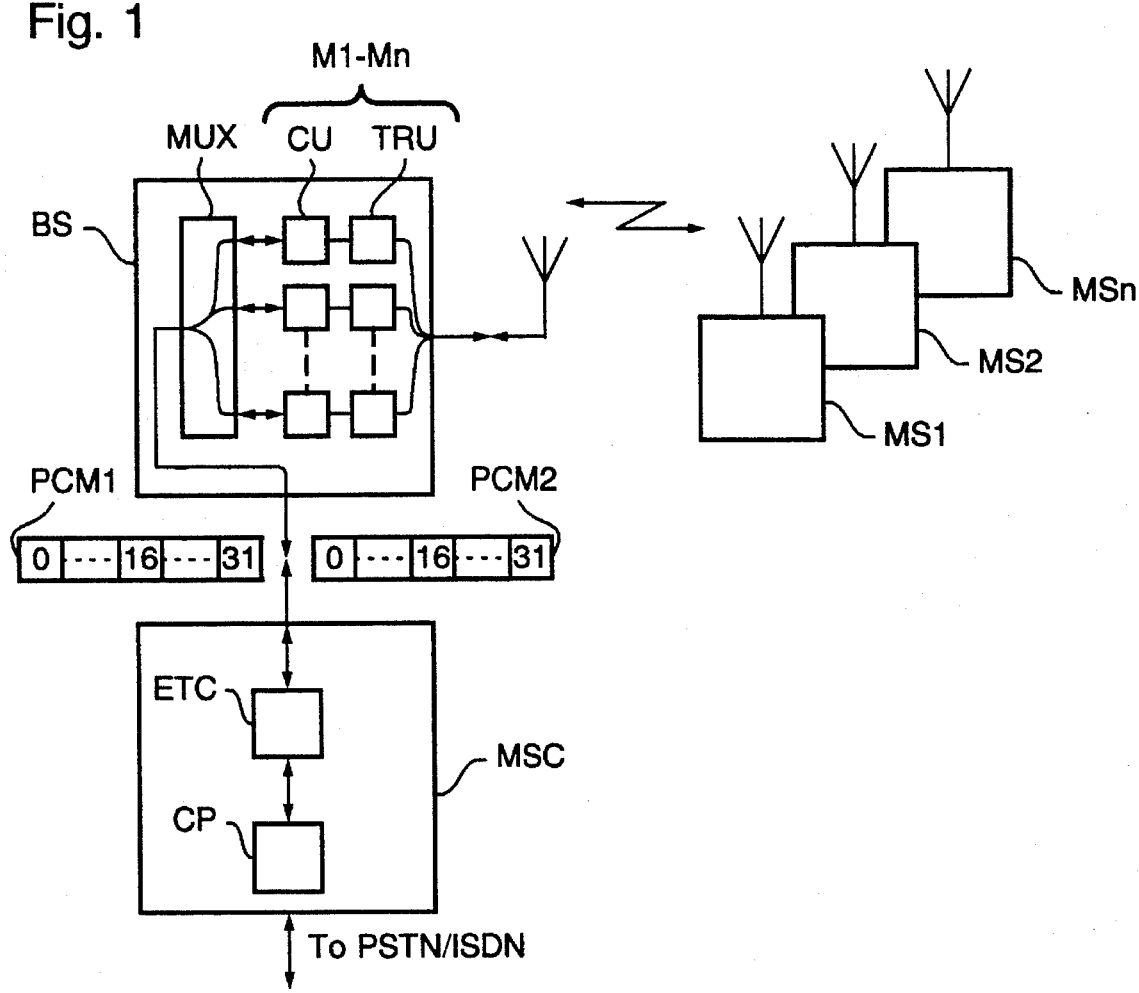
FIG. 1 is a block schematic which illustrates the units according to the invention in a mobile radio system in which the present invention is applied.

FIG. 1 is a simplified block schematic which illustrates part of a cellular mobile telephone system, for instance a time division multiple access system (TDMA) which includes a mobile telephone services switching centre MSC, a base station BS and a number of mobile stations MS1, MS2, . . . MSn. The system may comprise a large number of mobile stations n and a mobile telephone switching centre may serve more than one base station.

Each base station BS is connected to the switching centre by means of four wires for instance, and is comprised of a PCM-connection, i.e. the signals are sent to respective base stations in the form of PCM-words "PCM1" in a direction towards the base station, and "PCM2" in a direction away from the base station BS1 to the switching centre MSC. Each PCM-word is comprised of a number of time slots, for instance 32 time slots 0–31, where each time slot can be used to transmit messages to a base station. For instance, when four base stations are connected to the switching centre, 32/4=8 channels can theoretically transmit simultaneously in each direction between the switching centre MSC and a base station BS. However, some of these eight channels are reserved for controlling and checking purposes and also for another purpose which is utilized by the present invention in the manner described below.

The mobile services switching centre MSC includes a central processor CP and an exchange terminal circuit ETC. The processor CP stores the signalling messages that are to be used for the mobile radio communication, among others those that are used when practicing the inventive method, and the terminal unit ETC receives incoming traffic information (data, speech) from a public switched telephone network PSTN and includes this information, together with any control information from the processor CP, in a PCM-bit stream of words PCM1 to the base station. Naturally, solely control information can be sent from the processor CP, and similarly solely traffic information can be sent from the public switched network PSTN to a base station, although in the latter case control information from the processor CP is almost always interleaved with traffic information from the PSTN network.

Similarly, signalling information and/or traffic information is received as a stream of PCM-words PCM2 from a base station to the switching centre MSC and is there divided in accordance with the same principles as those applied for a transmission exchange-base station.

In the FIG. 1 illustration, a base station BS includes a multiplexor unit MUX which receives in one direction the information in those time slots in a PCM-word PCM2 from the switching centre that have been allocated to the base station BS, for instance eight channels. The base station can therefore, in principle, serve eight mobile stations simultaneously. A number of channel modules M1-Mn are disposed downstream of the multiplexor. Each of these modules includes a control unit CU and a transceiver unit TRU. When the system is an analog system, a PCM-channel k corresponds to a channel module Mk. These modules, however, can have different characters, for instance one module in a base station may be comprised of a control module for transmitting solely control messages, and the remaining modules may be traffic modules for transmitting solely traffic information (speech, data).When communicating with a mobile station by radio, one channel module Mk communicates with a mobile station MSk in both directions.

Figure 2:
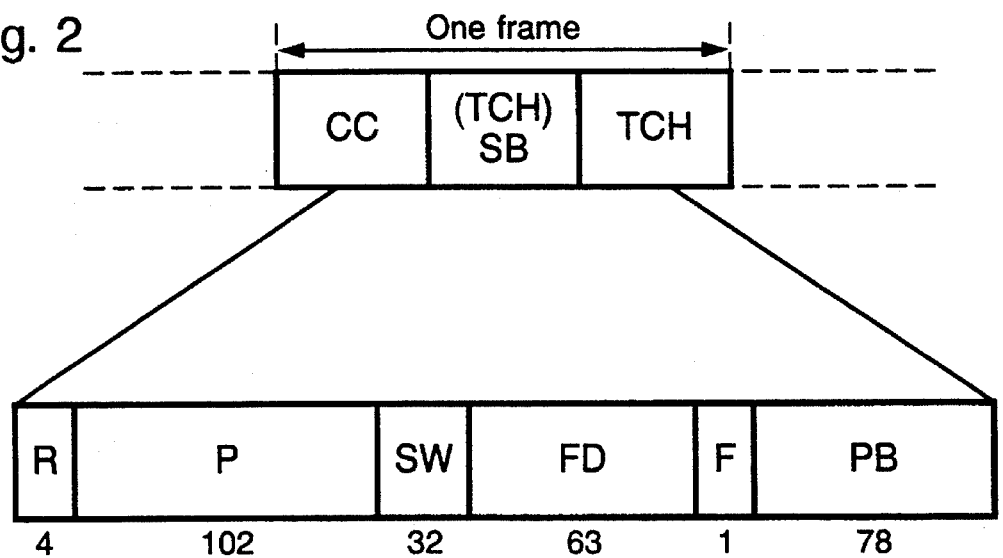
FIG. 2 illustrates a TDMA-frame having three time slots that can be used for communication in the mobile radio system shown in FIG. 1 and which are used when practicing the inventive method.

When the system is a TDMA-system, which in this case corresponds to the ADC system planned in North America, the channel modules are so configured that the time-divided information messages can be transmitted and received as bursts in frames having, in this case, three time slots per frame. FIG. 2 illustrates the configuration of one such frame.

The planned Japanese TDMA-system (JDC) will also have a similar structure. The inventive method will primarily be applied in such systems. According to the aforegoing the time division on the radio side means that if a channel module is able to operate with eight time slots per carrier wave, it is possible, in principle, for eight mobile stations to be served by one channel module. In turn, this means that a further seven PCM-connections can be established or set-up with a base station from the mobile services switching centre MSC. FIG. 2 illustrates the structure of a TDMA-frame according to the North American standard IS-54, which is also applicable to the Japanese standard. Each frame is comprised of three time slots (full rate), of which the first time slot is occupied by a control channel CC and the two remaining slots are occupied by traffic channels TCH. When applying the present invention, one time slot is used for a traffic channel TCH instead of for a synchronizing burst in a known manner. According to the Japanese standard, such a synchronizing burst is comprised of the following words (the number of bits shown in parenthesis):

R=ramping bits (4);

P=preamble (102);

SW=synchronizing word (32);

FD=a word field which includes three arrays of each of the following: colour code of the intended mobile station, burst identity, bits for burst time alignment, and counter setting of the superframe (63);

F=a "tail" (1); and

PB=terminating protector bits (78).

Figure 3:
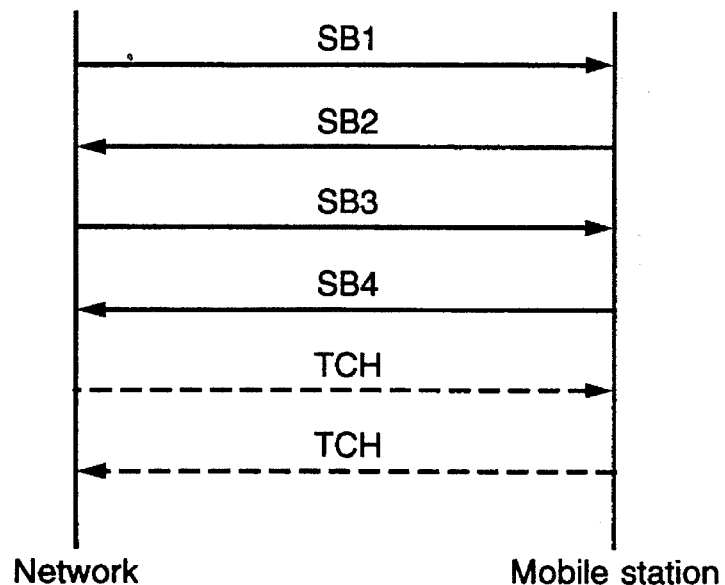
FIG. 3 is a signalling diagram (arrow diagram) illustrating one embodiment of the inventive method.

A first embodiment of the inventive method uses primarily the synchronizing field SW of the above word field, while a second embodiment of the inventive method uses the colour code in the field FD. FIG. 3 is a signalling diagram (arrow diagram) which illustrates one embodiment of the present invention for forced disconnection of an established connection. It is assumed that a mobile station MS1 has a connection established with the base station BS over a given traffic channel TCHk, and that the mobile station has moved with the result that this traffic channel has been impaired. However, it is not necessary for the channel TCHk to have been impaired, since other reasons may occur as to why the network desires the mobile station to relinquish this particular radio resource, for instance because the call is ended, the connection setup is unsuccessful or handover is unsuccessful. A worsening or change in channel quality is detected by the processor CP in the mobile services switching centre MSC, since the base station BS measures the signal strength of the connection to the mobile station MS1 (over SACCH) continuously, and reports the result of this measuring procedure to the switching centre MSC. When the network, in this case, the switching centre MSC, detects an impaired channel or an interruption in a normal signalling sequence, or that an expected signal has not been received, a re-synchronizing procedure is commenced in accordance with FIG. 3.

A first synchronizing burst SB1 with a synchronizing word SW in the word field illustrated in FIG. 2 is sent to the base station BS over a PCM-channel and also to the mobile station MS1, in a known manner.

The synchronizing word SW is included in the synchronizing burst which, according to the aforegoing, replaces a standard burst in the traffic channel between the base station BS and the mobile station MS1. Upon receipt of the burst SB1, the mobile station MS1 sends a synchronizing burst SB2 back to the switching centre MSC, via the base station BS, in acknowledgement and, at the same time, begins a time monitoring or time supervising process, which is described in more detail herebelow with reference to FIG. 4. The time monitoring process monitors the arrival of a second synchronizing burst SB3 from the switching centre MSC. In normal cases, when the quality of the channel is acceptable, such a synchronizing burst SB3 is sent back to the mobile station MS1, whereby the time monitoring process is stopped and the radio channel retained. According to the present invention, no such burst is sent back to MS1 in this case. The time limit to which the time monitoring process is set is thus exceeded, which in turn gives an indication that the mobile station MS1 shall relinquish the allocated radio channel TCHk.

When the burst SB3 is sent from the switching centre MSC and arrives at the mobile station MS1, the mobile station sends an acknowledgement or confirmation burst SB4 back to the switching centre MSC and, at the same time, begins a second time monitoring process while waiting for the arrival of a communication burst over the allocated traffic channel TCHk. If this communication burst does not arrive within a given space of time, determined by the time monitoring process, the mobile station MS1 will relinquish the allocated traffic channel TCHk, which is therewith released for other users. The two signalling procedures over the traffic channel TCH shown as a continuation (broken line in FIG. 2) relates to the normal case when forced disconnection of the mobile station is not desired by the network.

According to another embodiment of the inventive method, the forced disconnection or release of the traffic channel in use is effected with the aid of the so-called colour code included in a synchronizing burst SB according to FIG. 2. Upon receipt of the synchronizing burst SB3, which is assumed to contain an erroneous colour code DVCC, the synchronizing burst is rejected by the processor unit of the mobile station. This means that the aforesaid time monitoring process is not stopped and will therefore run out and the allocated traffic channel TCHk will be left, similar to the first described case.

A further embodiment of the invention will now be described with reference to the signal format illustrated in FIG. 4. This figure illustrates in more detail the division of a burst down-linked in a traffic channel TCH, where R=ramping bits;

TCH=data or speech information;

SW=synchronizing word;

DVCC=the colour code of the intended mobile station (MS1);

SF=flag indicating whether or not the data field comprises an FACCH; and

SACCH (RCH)=signalling information type 2 and type 3 respectively.

This embodiment no longer uses the synchronizing burst SB illustrated in FIG. 2, and instead bit errors are introduced into the standard traffic channel (FIG. 4) allocated to the mobile station MS1. Bit errors can be introduced by:

a) Changing the correct colour code DVCC of the mobile station to an erroneous colour code;

b) sending in the data field TCH speech information bits which are incorrect with regard to the coding standard;

c) sending signal information bits (FACCH, SACCH or RCH) which are incorrect with regard to the coding standard and/or error in CRC (Cyclic Redundancy Check); or d) changing the synchronizing word (SW) to an erroneous synchronizing word for the connection concerned.

Figure 4:
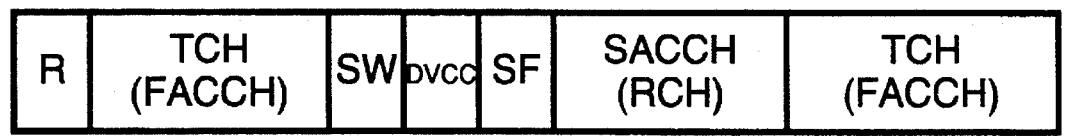
FIG. 4 illustrates a known signal format in which the synchronizing part is utilized in accordance with another embodiment of the inventive method.

The aforesaid bit errors can be introduced into one of the fields illustrated in FIG. 4 or into a number of these fields.

A mobile station, for instance the aforesaid mobile station MS1, will now be described in more detail with reference to FIG. 5. The block schematic shown in FIG. 5 merely illustrates those units which are relevant to the inventive method. The mobile station has a transmitter side and a receiver side.

The antenna A of the mobile station is connected to a duplex unit when the mobile radio system is a combined FDMA/TDMA-system, in which the carrier frequency of an incoming TDMA-signal to be received differs from the carrier frequency of a TDMA-signal transmitted from the transmitter side.

The transmitter side includes a sound recording unit (microphone) 11 which is connected to a speech coder-channel coder unit 12. Analog signals from the unit 11 are converted to digital signals and are speech-coded in accordance with known principles. In addition, the speech-coded digital signals are channel-coded to protect said signals against error and imperfections in radio transmission. So-called speech frames are obtained in this way. The speech signals are divided in the unit 12 into TDMA-bursts in a known manner, with one burst in each TDMA-frame. However, one speech frame may be dispersed between several time slots of the TDMA-frames.

The TDMA-signals from the speech coder-channel coder unit 12, and channel-coded TDMA-signals from a FACCH-generator 14 are received by an interleaving unit 13. The unit 13 therewith interleaves the TDMA-speech signals with the FACCH-signals so that when a FACCH-signal is to be transmitted in the form of a burst, the burst will replace a standard TDMA-speech burst from the unit 12.

A burst generator 15 receives the TDMA-signals from the interleaving unit 13, together with the following signals:

A synchronizing word SW plus a colour code DVCC (see FIG. 4) for the mobile station from the unit 16, which is only activated when such a word shall be transmitted in accordance with FIG. 2. The confirmation signals from the mobile station as described with reference to FIG. 2 are sent from this unit.

An interleaved (22 bursts) SACCH-message from the unit 17, which is activated over a traffic channel TCH according to FIG. 4 for transmitting such messages, e.g. measuring signal strength.

A control channel message from the unit 18 according to FIG. 2, over a control channel CC. This applies to the digital American system ADC and also to the Japanese system JDC, in which systems the present invention is intended to be applied.

The burst generator 15 is connected to an RF-modulator/amplifier unit 19 for modulating the TDMA-bursts with a radio frequency carrier wave and subsequent amplification. Prior to radio modulation, there is carried out a base band modulation, for instance a so-called QPSK-modulation in the American system, which converts the pulse-shaped TDMA-bursts from the burst generator into signals which are suitable for radio modulation in the modulator/amplifier unit 19.

In correspondence with its transmitter side, the mobile station receiver side includes an RF-demodula-tor unit corresponding to the RF-modulator in block 19, and also an IF-demodulator for base band demodulation of the radio modulated signals arriving from the duplex unit 10 and corresponding to the TDMA-bursts base band modulated on the transmitter side. For the sake of simplicity, these two demodulators have been combined in a single block 21.

The block 22 includes an equalizer and a symbol detector. The purpose of the equalizer is to compensate for the multipath propagation and time dispersion caused by the radio medium. Subsequent to equalization, the symbol detector detects the symbols transmitted to the receiver, so as to obtain a stream of TDMA-bursts which correspond as far as possible to the TDMA-bursts transmitted from the burst generator in the transmitter side of the base station BS.

The symbol detector in block 22 detects the various symbols in the incoming TDMA-bit stream and forms and separates the TDMA-bursts that belong to the traffic channel TCH and the control channel CC. The latter TDMA-bursts are delivered to a detector 23 for detecting the messages in the control channel CC and for further transmission of these messages to the mobile station control unit, in accordance with the following. The symbol detector also distinguishes between those TDMA-bursts that contain a SACCH-message, and delivers these bursts to a SACCH-detector 25, through a deinterleaver, 24 (22 bursts). A deinterleaving unit 26, corresponding to the interleaving unit 13 on the transmitter side separates out or distinguishes between any FACCH-message channels, which as earlier mentioned have been replaced with a traffic channel within a TDMA-frame. The major part of the TDMA-bursts from the unit 26, these bursts belonging to the traffic channel TCH allocated to the mobile station, are delivered to a block 28 which includes a channel decoder, a speech decoder and an analog-digital converter. The block 28 thus produces analog signals, which are delivered to a sound reproducing unit 29, for instance a loudspeaker.

The mobile station control unit 20 is a microprocessor, which stores the data and software required for the aforedescribed transmitting and receiving units. The arrows PC shown in FIG. 5 mark those units which are controlled by the microprocessor 20 (arrows pointing inwards to respective blocks) or which deliver the message words (arrows pointing outwards from respective blocks), which have been recovered from incoming radio signals to the microprocessor PC for further evaluation and possible calculation.

Figure 5:
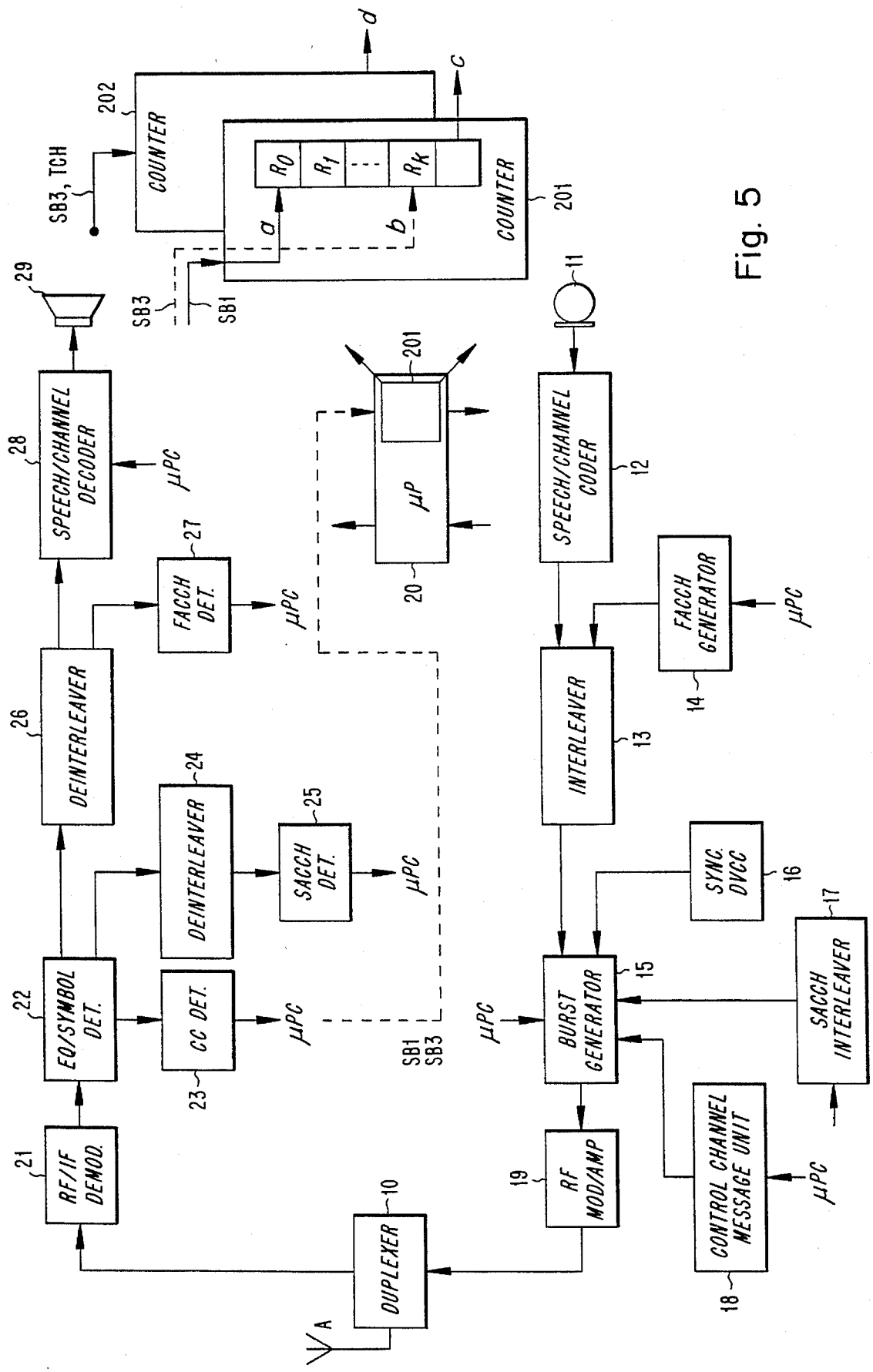
FIG. 5 is a block schematic which illustrates more clearly the transmitter and receiver units in an inventive mobile station.

When applying the inventive method to a mobile station MS1 of this kind, whose transmitter-receiver units are shown in FIG. 5, there is also provided in the microprocessor 20 a first and a second counter 201 and 202. These counters may possibly already be incorporated in the microprocessor for other purposes. The two counters are used to time-monitor the synchronizing bursts incoming to the mobile station MS1, as before mentioned.

The signalling procedure according to FIG. 2 will now be described in more detail with reference to FIGS. 1 and 5.

Should the mobile telephone switching centre MSC desire the mobile station to relinquish the used traffic channel for some reason or another (poor channel quality), a synchronizing signal in the form of a burst is sent in a PCM-time slot belonging to a control channel or synchronizing channel in the PCM-word PCM1 (FIG. 1). This signal burst arrives at the base station BS and is assigned by the multiplexor MUX and is allocated one control channel module Mk of the illustrated modules M1-Mn by the multiplexor MUX. The synchronizing burst SB1 is then transmitted in a known manner over the radio medium to the mobile station MS1, where it is received.

Subsequent to reception, demodulation, equalization and symbol detection in respective units A, 10, 21 and 22, the synchronizing burst is assigned to the control channel detector 23, since the burst has been transmitted over and belongs to the logic control channel CC. This detector essentially performs channel decoding of the same nature as that employed with standard traffic channels, and a synchronizing word field which includes, among other things, a synchronizing word according to FIG. 2 is delivered to the microprocessor 20.

The first synchronizing burst SB1 is thus passed to the microprocessor 20 and to the first counter 201 in said processor, said counter being activated by this burst. The counter 201 thus begins to count from a first value Ro to a given counter value Rk constituting a time-out threshold for the second synchronizing burst SB3 from the mobile telephone services switching centre MSC. This burst is sent from the switching centre MSC after a given period of time has lapsed, this time lapse depending on whether the switching centre wishes the channel to be relinquished or not. The latter case (the channel shall be retained) is the normal case and is not discussed here.

If the switching centre MSC wishes the mobile station to relinquish or release the channel, the synchronizing burst SB3 is either not sent or is sent wrongly or is sent after a time lapse which exceeds the time for indexing forwards the counter state Rk. When the counter state Rk+1 is reached, a signal c is sent from the counter 201 to those units in the microprocessor 20 which disclose that the used channel shall be disconnected and which are responsible for this disconnection of the channel. This is effected in a known manner and will not therefore be described here. The synchronizing signal SB1 can be transmitted continuously from the very beginning, until the time monitoring period has expired.

Upon receipt of the synchronizing burst SB1, the process 20 commands the message generator 18 to form and deliver the acknowledgement signal SB2 to the burst generator 15 and also to transmit this signal back to the mobile telephone services switching centre MSC from the mobile station MS1. This acknowledgement signal is received by the base station BS in a control channel receiver module and is sent further to the switching centre MSC over the control channel in a PCM-word PCM2 according to FIG. 1. If the synchronizing burst SB1 has not been received (poor channel), the burst SB3 is not accepted and the counter 201 is not activated. The switching centre is then forced to retransmit the synchronizing burst SB1.

The processor 20 may be provided with a second counter 202. This counter may be intended to receive the second synchronizing burst SB3, particularly when the synchronizing burst SB3 has stopped the counter 201 and when a further check is desired to ascertain whether or not a channel shall be disconnected. When the second synchronizing burst SB3 has arrived, an acknowledgement to this effect is sent from the mobile station by means of a synchronizing burst SB4, in the same manner as that applying to burst SB2. The second counter 202 is activated by the synchronizing burst SB3 and, in principle, counts in the same manner as the counter 201, although possibly with another threshold value Rk. Similar to the case of counter 201, a signal d is produced at time out, i.e. when the counter setting Rk has been exceeded, thus indicating that the allocated radio channel has been relinquished. If the switching centre MSC desires the mobile station to relinquish the channel, no signal is sent back to the mobile station and time measuring runs out. This results in the allocated channel being relinquished by the mobile station. On the other hand, when the switching centre desires the mobile station to retain the allocated channel, signalling is effected normally over a traffic channel TCH to stop the time count.

We claim:

1. A method of disconnecting a communications connection established between a mobile station and a network in a mobile radio system in which communication between the network and a plurality of mobile stations takes place over a number of communications channels and in which communication over an allocated communications channel between the network and a given mobile station is commenced and terminated in response to normal signalling from the network to the mobile station, comprising the steps of:

detecting, in the network, a state of the allocated communications channel which indicates that communication on the allocated channel has been degraded and therefore shall be disconnected;

sending a first signal from the network to the mobile station;

sending, upon receipt of the first signal, an acknowledgement signal from the mobile station to the network and activating a time monitoring process;

sending, upon receipt of the acknowledgement signal, a second signal from the network to the mobile station;

wherein the second signal, when received by the mobile station, prevents the time monitoring process from stopping, whereby the mobile station relinquishes the allocated communications channel; and sending a second acknowledgement signal responsive to the relinquish from the mobile station to the network in order to inform the network about the relinquished communications channel.

2. The method of claim 1, wherein the second signal includes an erroneous characterizing color code for the mobile station, the erroneous characterizing color code being different from a color code stored in the mobile station, thereby preventing the time monitoring process from stopping.

3. The method of claim 1, wherein the second signal includes an error correcting code that causes the mobile station to indicate an excessively high bit error content in the received second signal, thereby preventing the time monitoring process from stopping.

4. A method according to claim 1, wherein when the time monitoring process reaches a predetermined period of time, the mobile station relinquishes control the allocated communications channel.

5. In a mobile radio system comprising a plurality of mobile stations and a mobile radio network which signals to the mobile stations to set up connections over allocated communications channels and to disconnect such connections when the allocated channels become degraded, a mobile station comprising:

a transmitter unit;

a receiver unit comprising:

means for detecting signals from the mobile radio network, the detecting means including means for detecting and correcting errors, and a processor unit comprising a time monitoring unit activated upon receipt of synchronizing signals from the network and set to a synchronizing signal time limit which shall not be exceeded if a communications channel allocated to the mobile station is to be retained, wherein when the receiver unit detects a first synchronizing signal correctly, the processor unit activates the time monitoring unit, thereby initiating a time measuring process, and causes the transmitter unit to send an acknowledgement signal to the network; and when the receiver unit detects a second synchronizing signal that is subsequently sent from the network and that cannot be detected correctly by the mobile station, the time monitoring unit remains activated, whereby the mobile station relinquishes the allocated communications channel when the synchronizing signal time limit is exceeded and sends a second acknowledgement signal responsive to the relinquish from the mobile station to the network in order to inform the network about the relinquished communications channel.

6. The mobile station of claim 5, wherein the processor unit includes a second time monitoring unit which initiates another time measuring process in response to the second synchronizing signal, the time measuring process initiated by the second time monitoring unit being terminable by the mobile station's receipt of a stop signal, and causes the transmitter unit to send a second acknowledgement signal to the network after receipt of the second synchronizing signal; and the allocated communications channel is retained when the stop signal is received before the second time monitoring unit measures a predetermined time period.

\* \* \* \* \*